US012801841B2

(12) United States Patent
Creager et al.

(10) Patent No.: US 12,801,841 B2
(45) **Date of Patent: *Nov. 17, 2026**

(54) AUTOMATICALLY CONFIGURING AN INSIGHT CAROUSEL OF A GRAPHICAL USER INTERFACE BASED ON TEMPLATES

(71) Applicant: Truist Bank, Charlotte, NC (US)

(72) Inventors: James Harrison Creager, Raleigh, NC (US); Reinaldo Gamaliel Rivera Colon, Raleigh, NC (US); Jennifer Merten, Brookhaven, GA (US); Natalie Stormer, Raleigh, NC (US); Alisha Belk, Raleigh, NC (US); Kelly Griffin, Matthews, NC (US)

(73) Assignee: TRUIST BANK, Charlotte, NC (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/621,567

(22) Filed: Mar. 29, 2024

(65) Prior Publication Data

US 2024/0242025 A1 Jul. 18, 2024

Related U.S. Application Data

(63) Continuation of application No. 17/861,637, filed on Jul. 11, 2022, now Pat. No. 11,972,206.

(51) Int. Cl.
*G06F 40/186* (2020.01)
*G06F 40/134* (2020.01)

(52) U.S. Cl.
CPC .......... *G06F 40/186* (2020.01); *G06F 40/134* (2020.01)

(58) Field of Classification Search
CPC .... G06F 40/186; G06F 3/0485; G06F 3/0482; G06F 40/134; G06F 40/143
See application file for complete search history.

(56) References Cited

U.S. PATENT DOCUMENTS

| | | | | |
|---|---|---|---|---|
| 8,548,909 | B1 | 10/2013 | Snow et al. | |
| 9,026,915 | B1 * | 5/2015 | Ehlen | G06F 16/9538 715/728 |
| 9,846,895 | B1 | 12/2017 | Rus et al. | |
| 10,984,482 | B1 | 4/2021 | Thangarajah et al. | |
| 2002/0165799 | A1 * | 11/2002 | Jaffe | G06Q 30/02 707/999.102 |
| 2012/0304068 | A1 | 11/2012 | Zaman et al. | |
| 2013/0346302 | A1 | 12/2013 | Purves et al. | |
| 2014/0052615 | A1 | 2/2014 | Andersen | |
| 2014/0164985 | A1 * | 6/2014 | Pimmel | G06F 16/9535 715/784 |
| 2016/0027124 | A1 | 1/2016 | Rojas | |
| 2017/0093780 | A1 | 3/2017 | Lieb et al. | |
| 2017/0139924 | A1 * | 5/2017 | Avera | G06Q 40/06 |
| 2017/0221062 | A1 | 8/2017 | Katz et al. | |
| 2017/0279747 | A1 | 9/2017 | Melzer et al. | |

(Continued)

*Primary Examiner* — Wilson W Tsu
(74) *Attorney, Agent, or Firm* — Michael A. Springs, Esq.; Shumaker, Loop & Kendrick, LLP; Patrick B. Horne

(57) ABSTRACT

Some examples described herein relate to automatically configuring an insight carousel of a graphical user interface based on templates. In one example, a system can receive templates and insights associated with transactions, populate fields within each template using information associated with the insights, and generate a graphical user interface including an image carousel having slides incorporating the populated templates.

20 Claims, 11 Drawing Sheets

(56) References Cited

U.S. PATENT DOCUMENTS

| | | | |
|---|---|---|---|
| 2018/0174236 | A1 | 6/2018 | Hosp et al. |
| 2018/0349556 | A1* | 12/2018 | Owen .................... G16H 15/00 |
| 2020/0042966 | A1 | 2/2020 | Deluca et al. |
| 2020/0065121 | A1 | 2/2020 | Hart et al. |
| 2020/0065342 | A1 | 2/2020 | Panuganty |
| 2020/0210647 | A1 | 7/2020 | Panuganty et al. |
| 2021/0278934 | A1* | 9/2021 | Hunter .................. G06F 3/0482 |
| 2022/0122144 | A1* | 4/2022 | Papale, III ......... G06Q 30/0621 |
| 2022/0230222 | A1 | 7/2022 | Duffy et al. |

* cited by examiner

500

AUTOMATICALLY CONFIGURING AN INSIGHT CAROUSEL OF A GRAPHICAL USER INTERFACE BASED ON TEMPLATES

CROSS-REFERENCE TO RELATED APPLICATIONS

This application is a continuation of U.S. patent application Ser. No. 17/861,637 filed Jul. 11, 2022, titled "AUTOMATICALLY CONFIGURING AN INSIGHT CAROUSEL OF A GRAPHICAL USER INTERFACE BASED ON TEMPLATES", the entirety of which is incorporated herein by reference.

TECHNICAL FIELD

This disclosure generally relates to graphical user interfaces. More specifically, but not by way of limitation, this disclosure relates to automatically configuring an insight carousel of a graphical user interface based on templates.

BACKGROUND

Some entities allow users to view transactions facilitated by those entities online. For example, those entities often provide websites, portals, and software applications that enable users to view transaction data. These websites, portals, and software applications provide users with real-time access to transaction-related information. Frequently, these entities will offer tips and suggestions related to their transactions. In some cases, these tips and suggestions come in the form of text and visualizations. However, interfaces in existing websites, portals, and software applications are not well-suited for presenting these tips and suggestions.

SUMMARY

Embodiments described herein pertain to automatically configuring an insight carousel of a graphical user interface based on templates.

According to some embodiments, a method includes receiving, by a processor of a service provider, a plurality of insights from an entity, each insight of the plurality of insights being associated with at least one transaction made by a first user; retrieving, by the processor of the service provider, a plurality of templates from a template store, each template of the plurality of templates comprising a text field for inserting text that describes a respective insight of the plurality of insights, a visual representation field for inserting a visual representation of the respective insight, and a link field for inserting a link for accessing information related to the respective insight; generating, by the processor of the service provider, a plurality of populated templates by filling in the text field, visual representation field, and link field in each template of the plurality of templates; and generating, by the processor of the service provider, a graphical user interface that includes an image carousel comprising a plurality of slides corresponding to the plurality of populated templates, each respective slide of the plurality of slides comprising a respective populated template of the plurality of populated templates and an indicator area for displaying an indication of whether the respective slide has been viewed by one or more second users.

Some embodiments of the present disclosure include a system including one or more processors and one or more computer-readable storage media comprising instructions that are executable by the one or more processors for causing the one or more processors to perform part or all of the methods disclosed herein.

In some embodiments, a non-transitory computer-readable medium stores instructions that when executed by one or more processors cause the one or more processors to perform part or all of the methods disclosed herein.

BRIEF DESCRIPTIONS OF THE DRAWINGS

DETAILED DESCRIPTION

Figure 1:
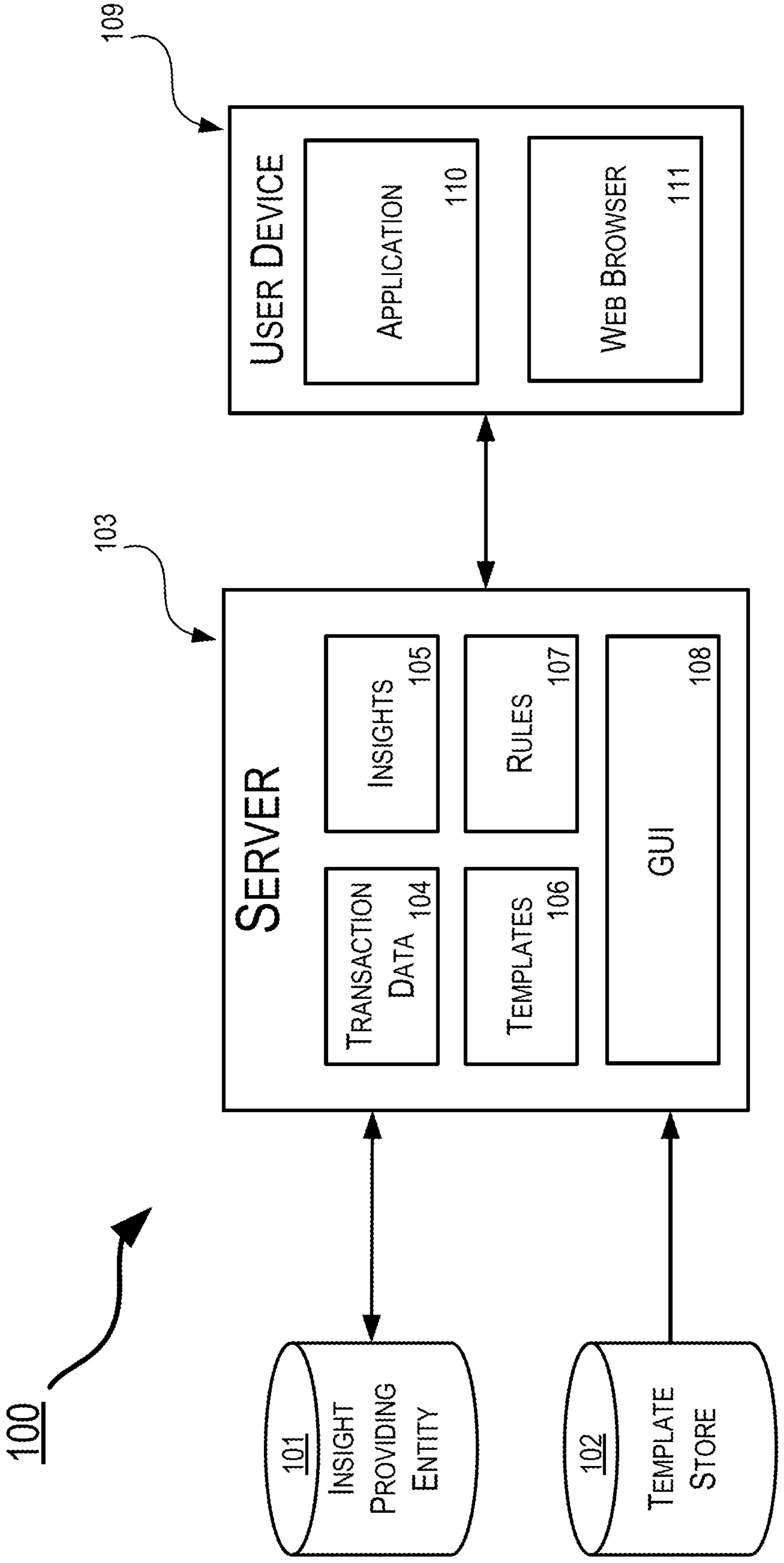
FIG. 1 shows an example of a system for automatically configuring an insight carousel of a graphical user interface based on templates according to some aspects of the present disclosure.

Certain aspects and features of the present disclosure relate to automatically configuring an insight carousel of a graphical user interface based on templates. An insight carousel can be a type of image carousel in which the slides include insight information. For example, a graphical user interface can include an insight carousel. The graphical user interface can also include pages associated with the slides of the carousel. The pages can be accessed by selecting the slides of the carousel. The insight carousel can present the insights in a way that is more intuitive than a generic list and allow for user interaction, through which the user may be able to quickly and easily navigate through the slides to view multiple insights.

In some examples, the slides of the insight carousel can be automatically generated based on templates. In particular, each slide in the insight carousel can be generated using a template that is populated with information relating to a corresponding insight. The insights can be associated with user transactions and can be received from an entity that provides such insights. Each template can include a number of fields, such as a text field, a visual representation field, and a link field. Relevant information about an insight can be inserted into the fields of a template to populate the template, from which a corresponding insight slide can be automatically produced for inclusion in the insight carousel. Different insights may have different corresponding templates that can be used to produce different kinds of insight slides. By filling in the text field, visual representation field, and link field of a template with the information associated with a selected insight, an insight slide can be automatically generated and inserted into the insight carousel of the graphical user interface. Using this template approach, the insight carousel may be automatically and dynamically generated (e.g., on-the-fly) each time a user loads the graphical user interface, which can allow for greater customization and flexibility as compared to a preprogrammed and static insight list. For example, the template approach can allow for greater flexibility because the insight carousel can be automatically updated as new insights are added and older insights are removed from a set of insights to be displayed in the insight carousel. This automated process can also expedite the creation of the insight carousel, for example by not requiring a developer to manually program and customize each slide in the insight carousel.

An insight can be any information that provides a user of a service provider with a deeper and intuitive understanding of user transactions facilitated by the service provider. Current websites, portals, and applications are not well-suited to placing these insights in a graphical user interface page in a way that is easily digestible and navigable for the user. In contrast, some examples of the present disclosure can include features such as the insight carousel that is designed to facilitate easy access to a large number of insights and presents the insights in an easily digestible way. For example, a system described herein can dynamically populate template fields with information associated with a selected insight in a consistent, but flexible manner across all slides of the image carousel. Accordingly, insights may be spatially organized in a way that is more intuitive to the user than is possible with conventional user interfaces.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows an example of a system 100 for automatically configuring an insight carousel of a graphical user interface based on templates according to some aspects of the present disclosure. As shown in FIG. 1, the system 100 is configured with a server 103 and a user device 109. The server 103 may be a server of a service provider, such as the service provider described above, and may facilitate transactions made by a user, such as the user described above, of the service provider. The server 103 is configured to store and manage transaction data 104 for transactions involving one or more users of the service provider. The server 103 is also configured to store insights 105 and templates 106 used in generating graphical user interface pages for presenting information related to the insights and the transactions. The server 103 is also configured to store rules 107 for determining how the information related to the insights should be placed on the graphical user interface pages. The server 103 can also generate a graphical user interface 108 that includes the graphical user interface pages. The graphical user interface 108 can be generated based on the insights 105, templates 106, and rules 107. The server 103 can organize the graphical user interface pages and provide them to a user device 109.

Figure 11:
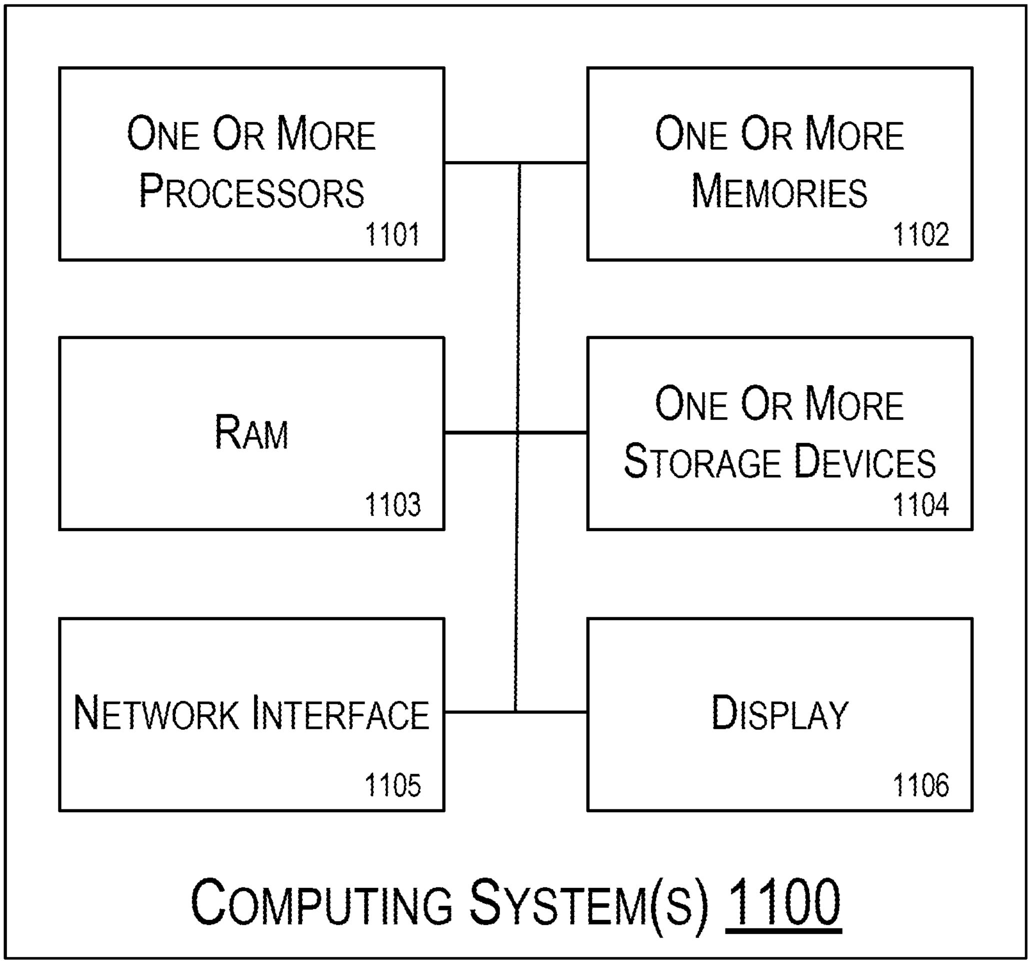
FIG. 11 shows an example of a computing system usable to implement some aspects of the present disclosure.

The server 103 is configured with hardware and software that enables the server 103 to store and manage data and provide the graphical user interface 108. Server 103 may be any kind of computing device or computing system, such as computing system 1100 as shown in FIG. 11. For example, server 103 may be a desktop computer, a personal computer, a workstation and/or any variation thereof. In another example, server 103 may form part of a distributed computing system. In other examples, the server 103 may be any kind of electronic device that is configured to store and manage data and generate a graphical user interface in accordance with a part of all of the methods disclosed herein.

The server 103 may receive insights 105 from an insight providing entity 101. In some examples, the insight providing entity 101 transmits the insights 105 to the server 103 via an application programming interface (API). The insight providing entity 101 may be a server, a data store, a network, or other entity that stores insights and related information. In some examples, the insight providing entity 101 is a service provider, such as the service provider discussed above or another service provider. The insight providing entity 101 generates one or more insights based on transaction data 104 for one or more users. The insight providing entity 101 can receive the transaction data 104 from the server 103 or from another source. The transaction data 104 may include information about transactions facilitated by the service provider for one or more users. For each transaction, the transaction data 104 can include information indicating a type of transaction (e.g., a deposit, a withdrawal, a transfer, a loan, a payment, and the like), an amount of the transaction, a date of the transaction, information identifying one or more users associated with the transaction, information identifying one or more accounts associated with the transaction, and a priority score for the transaction. The insight providing entity 101 may generate an insight based on one transaction or several transactions. In some examples, the insight providing entity 101 generates an insight for transactions related by type, amount, users involved, and/or accounts involved. Each insight may include one or more textual elements and visual elements. For example, an insight can include a graphic, an image, or text. In some such examples, an insight may include a graphic or image representing the insight and text that describes the graphic, image, or insight itself. In some examples, each insight may include metadata and other data describing characteristics of the insight. In other examples, an insight may be generated based on any number of transactions related in any way and each insight can include any number of textual and/or visual elements.

The server 103 may receive templates 106 from a template store 102. The template store 102 may be a server, a data store, a network, or other entity that stores templates and related information. In some examples, the template store 102 is a service provider, such as the service provider discussed above or another service provider. As discussed above, templates 106 are used by the graphical user interface 108 in generating graphical user interface pages that present information related to insights and transactions to users. Each template may include a text field for inserting text that describes an insight, a visual representation field for inserting a visual representation of the insight, and a link field for inserting a link for accessing information related to the insight. The graphical user interface pages may be generated by selecting a template and populating the template by filling in the text field, visual representation field, and link field. In some examples, the template store 102 can provide templates including any number of fields and any field types.

The server 103 is configured to provide the graphical user interface 108 to the user. For example, the server 103 can transmit program code (e.g., HTML, CSS, or JS) defining the graphical user interface 108 to the user device 109, where the program code is executable or interpretable by the user device 109 to generate the graphical user interface 108 for display to the user. The user device 109 can present the graphical user interface 108 to the user in any suitable manner, such as through one or more applications 110 and web browsers 111. The service provider may provide one or more interfaces, such as websites, portals, and/or software applications for presenting insights to a user. A user of user device 109 may access one or more of those interfaces using an application 110 and/or web browser 111 of user device 109 to view the graphical user interface 108 and other interfaces.

The user device 109 is configured with hardware and software that enables the user device 109 to provide an application 110 and web browser 111. User device 109 may be any kind of mobile electronic device or portable electronic device that is configured to provide applications and web browsers. For example, user device 109 may include a mobile phone or tablet and/or any variation thereof. User device 109 may also be any other kind of computing device or computing system, such as computing system 1100 as shown in FIG. 11. In some examples, the application 110 and web browser 111 are installed on the user device 109. In other examples, the application and web browser are cloud-based and provided to the user device 109 via one or more communication channels.

The graphical user interface 108 includes graphical user interface pages for presenting transaction information and corresponding insights to a user. In some examples, the graphical user interface page can include a slide in an image carousel, such as slide 210 shown in FIG. 2. In other examples, the graphical user interface page can include an insight listing, such as insight listings 400 shown in FIG. 4. In further examples, the graphical user interface page can also include a page in which insights can be spatially positioned at selected spatial locations, such as in graphical user interface page 601 shown in FIG. 6. Other graphical user interface pages can be generated. For example, the graphical user interface 108 can generate a variety of different pages for display on a user device that presents insights to users of the service provider.

Figure 2:
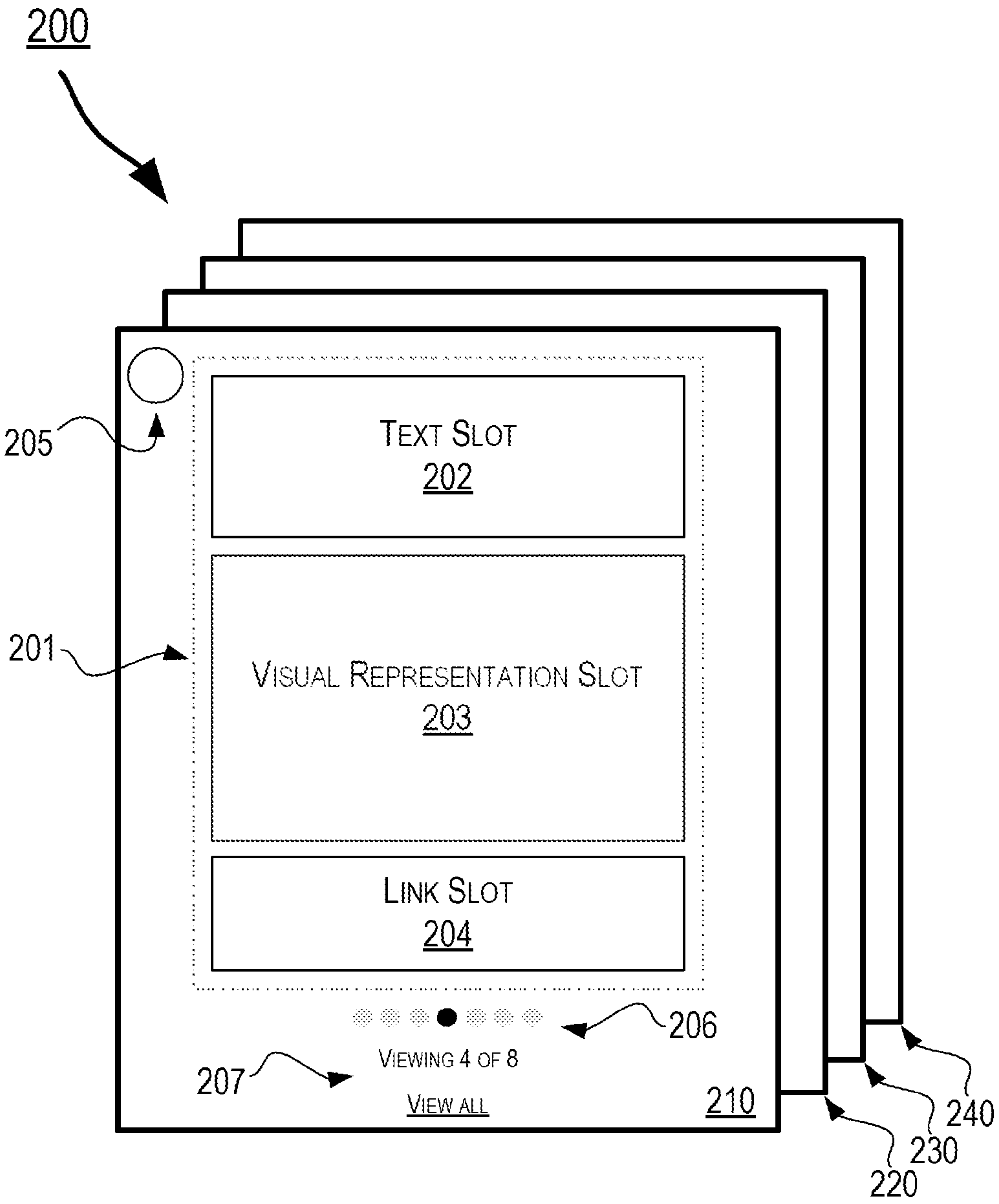
FIG. 2 shows an example of a graphical user interface according to some aspects of the present disclosure.

FIG. 2 shows an example of a graphical user interface according to some aspects. As shown in FIG. 2, the graphical user interface includes an image carousel 200. Image carousel 200 includes slides 210, 220, 230, 240. Each slide includes a template 201 that has been populated with insight information and an indicator area 205 for displaying an indication of whether the slide has been viewed by a user. Additionally or alternatively, the indicator area 205 can indicate whether an insight is a new insight (e.g., an insight received within a recent predetermined period of time such as within the past two days). The user viewing the slide may be the same or a different user as the user involved with the transaction. For example, a transaction may be made by a first user of a joint account and a second user of the joint account may view the slide 210 in image carousel 200. Upon viewing the slide 210, the indicator area 205 indicates that the slide has been viewed (e.g., by changing color/hue or by disappearing). Each slide can also include a slide number indicator 207, which indicates the current slide number among a total number of slides. Each slide may further include a seeking indicator 206, which indicates whether any slides precede the current slide and/or are subsequent to the current slide in the image carousel. A user may interact with the image carousel to view a preceding slide or a subsequent slide. For example, by swiping on a touchscreen display, pushing arrow keys on a keyboard, or by using a mouse, the image carousel can be navigated to any one of the preceding slides and subsequent slides. Each slide may further include a "view all" link for viewing all the slides. The slides can be viewed in a single page with each slide in a thumbnail image format on that page. Alternatively, or additionally, the slides may be listed in a set of rows or using another organizational scheme, such as the insight listing page 400 shown in FIG. 4 and further described below.

As discussed above, templates 106 can be populated and incorporated into the graphical user interface 108 to generate graphical user interface pages, such as slides 210, 220, 230, and 240. In the example shown in FIG. 2, each template includes a text field 202 for inserting text that describes a selected insight, a visual representation field 203 for inserting a visual representation of the selected insight, and a link field 204 for inserting a link for accessing information related to the selected insight. However, more, fewer, or different template fields are possible. Templates may include any number of fields and any field types, in any number of shapes and sizes, to receive text that can be generated in more than one way. The graphical user interface pages may be generated by selecting an insight from the insights 105 and a template from templates 106 and populating the template by filling in the text field, visual representation field, and link field.

The text field 202 can be filled by generating text that describes a selected insight based on information associated with the selected insight. In some examples, for insights including the textual elements discussed above, the text can be the text of the textual elements itself. In other examples, the text can be a derivation of the text of the textual elements. For insights including visual elements, the text can be generated using metadata included with the insight or from the transaction data 104 for the transaction or transactions associated with the insight. In some examples, the text can be generated by a human operator of the server 103 or the user. The amount of the text included in the description can be variable and based on the size of the text field 202.

Additionally, the text field 202 can be filled by placing the generated text anywhere in the text field 202. The generated text may occupy the whole text field 202 or a portion of the text field 202. In some embodiments, the generated text may be justified in any direction (e.g., top-left through bottom-right justifications). The text field 202 and associated template 201 may be configured to accommodate graphical user interface pages and slides 210, 220, 230, and 240 having various sizes and shapes. The text can be generated manually, for example based on input by a human user or a human operator. Alternatively, or in addition, the text can be generated automatically, for example based on optical character recognition, natural language processing, computer vision, machine learning, and artificial intelligence techniques, and the like.

The visual representation field 203 can be filled by generating a visual representation of the selected insight based on information associated with the selected insight. For insights including the textual elements discussed above, the visual representation can be the text of the textual elements, other text describing the insight, a graphic representing the insight, or an image representing the insight. For insights including visual elements, the visual representation can be generated based on the visual element, based on metadata included with the insight, or from the transaction data 104 for the transaction or transactions associated with the insight. For example, the visual representation can be a graphical derivation of image elements included in the visual elements of the selected insight. In some examples, the visual representation can be generated by a human operator of the server 103 or the user. The size of the visual representation can be variable and based on the size of the visual representation field 203.

Additionally, the visual representation field 203 can be filled by placing the generating visual representation anywhere in the visual representation field 203. The generated visual representation may occupy the whole visual representation field 203 or a portion of the visual representation field 203. In some examples, the generated visual representation may be justified in any direction (e.g., top-left through bottom-right justifications). The generated visual representation can be placed in the visual representation field 203 in any suitable manner. The visual representation field 203 and associated template 201 can be configured to accommodate graphical user interface pages and slides 210, 220, 230, and 240 having various sizes and shapes. The visual representation can be generated manually, for example based on input by a human user or a human operator. The visual representation can be generated automatically, for example based on optical character recognition, natural language processing, computer vision, machine learning, and artificial intelligence techniques, and the like.

The link field 204 can be filled by inserting a link for accessing the information associated with the selected insight. The link may be provided by the insight providing entity 101 or another source. Alternatively, the link can be generated by the service provider or the server 103. By accessing the link from within application 110 or web browser 111, one or more interfaces may launch and provide additional information associated with the selected insight. The additional information may include one or more of the following: a brief description of the insight, a detailed explanation of the insight, tips and suggestions for improving user behavior, a listing of the transaction or transactions associated with the insight, and transaction data associated with the transaction or transactions which resulted in the insight. Other types of additional information may also be provided to assist the user or users in obtaining a deeper and intuitive understanding of transactions, accounts, and other interactions that are associated with the user or users and facilitated by the service provider. The link may be any suitable type of link, such as a web link. One example of a web link can be a uniform resource locator. The link may be provided in any suitable format that provides a user with means for accessing the additional information associated with the selected insight.

Additionally, the link field 204 can be filled by placing the link anywhere in the link field 204. The link may occupy the whole link field 204 or a portion of the link field 204. In some embodiments, the link may be justified in any direction (e.g., top-left through bottom-right justifications). Other link positions are also possible, and the link can be placed in the link field 204 in any suitable manner. The link field 204 and associated template 201 can be configured to accommodate graphical user interface pages and slides 210, 220, 230, and 240 having various sizes and shapes. The link can be generated manually, for example based on input by a human user or a human operator. Alternatively, or in addition, the link can be generated automatically, for example based on optical character recognition, natural language processing, computer vision, machine learning, and artificial intelligence techniques, and the like.

Figure 3:
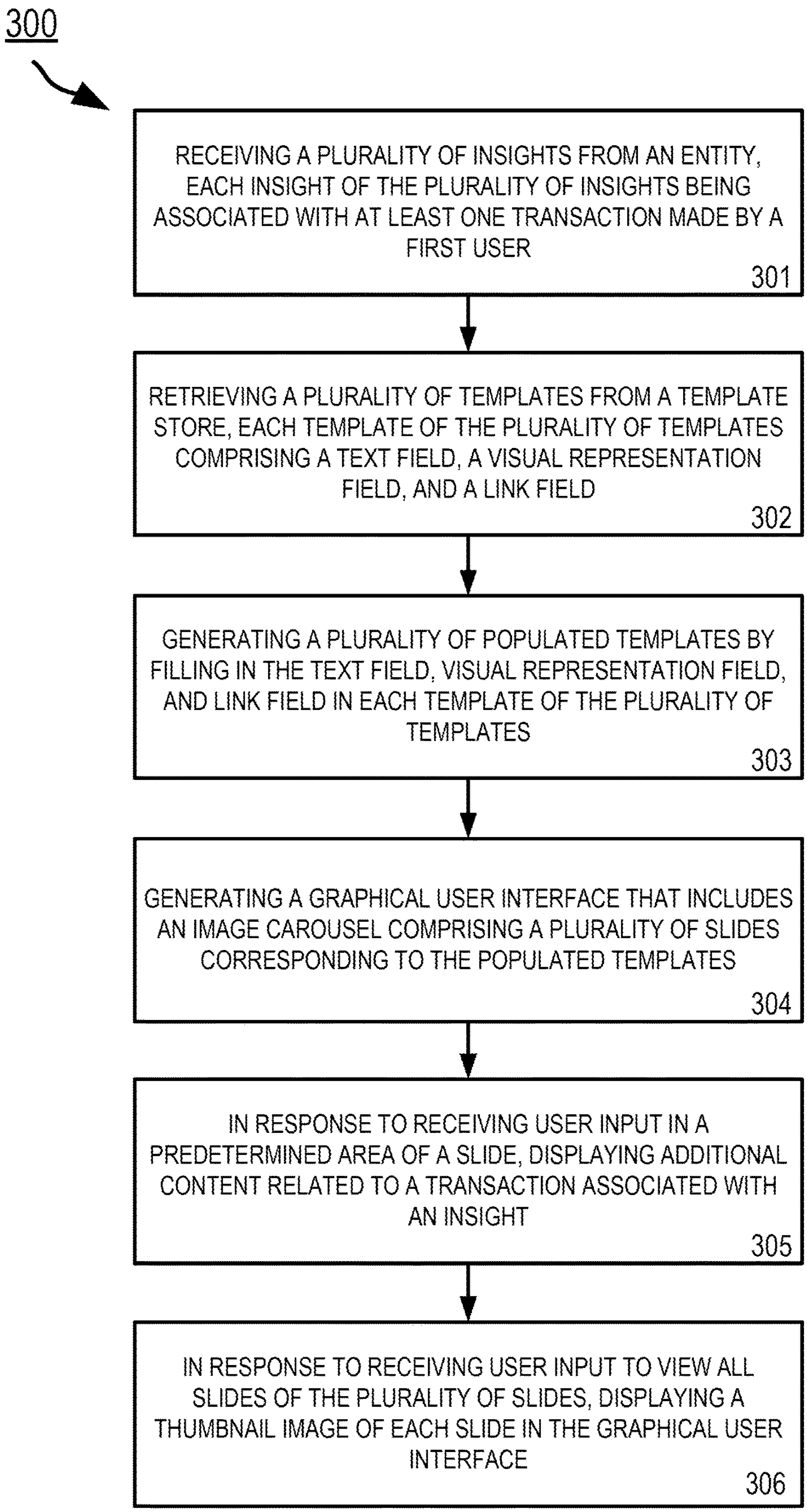
FIG. 3 shows an example of a process for automatically populating templates with insights for slides of an image carousel according to some aspects of the present disclosure.

FIG. 3 shows an example of a process 300 for automatically populating templates with insights for slides of an image carousel. In some examples, the process is implemented by the server 103 or another computing system, such as computing system 1100 as shown in FIG. 11. The process can be implemented in software or hardware or any combination thereof.

At block 301, insights are received by the service provider (e.g., by server 103) from an entity, such as insight providing entity 101, that is configured to generate the insights by analyzing transactions made by a first user. In some embodiments, each insight is associated with at least one transaction made by the first user.

At block 302, templates are retrieved by the service provider from a template store, such as template store 102. Each template may include a text field for inserting text that describes a respective insight of the received insights, a visual representation field for inserting a visual representation of the respective insight, a link field for inserting a link for accessing information related to the respective insight, or any combination of these. In some examples, the templates are retrieved by selecting the templates from the template store based on characteristics of the received insights.

At block 303, populated templates are generated by the service provider. The templates are populated by filling in the text field, visual representation field, and link field of each template. The text, visual representation, and link fields are filled by generating text describing a selected insight based on a size of the text field, generating a visual representation of the selected insight based on information associated with the selected insight, and generating a link for accessing the information associated with the selected insight.

At block 304, a graphical user interface, such as graphical user interface 108, is generated by the service provider. The graphical user interface includes an image carousel including slides corresponding to the populated templates. Each slide includes a populated template. Each slide may also have an indicator area for displaying an indication of whether the respective slide has been viewed by one or more second users, at least one of which may be the same as or different than the first user.

At block 305, user input corresponding to a selection of the current slide is received. The user input can be received in a predetermined area of a current slide in the image carousel. In response to receiving the user input, additional content related to at least one transaction associated with the respective insight may be provided. The additional content may include transaction data for the at least one transaction that forms part of transaction data 104. The additional content may additionally or alternatively include one or more pieces of information accessible by the link (for accessing the information associated with the selected insight) in the link field 204.

At block 306, user input corresponding to a selection of the view all link for viewing all slides or insights is received. In response to receiving the user input, a single page may be provided that includes some or all of the slides. Each slide may be represented on the page in a thumbnail image format or using another format. For example, the slides can be listed in a set of rows, with each row corresponding to a respective slide. One example of such an insight list will now be described below with respect to FIG. 4.

Figure 4:
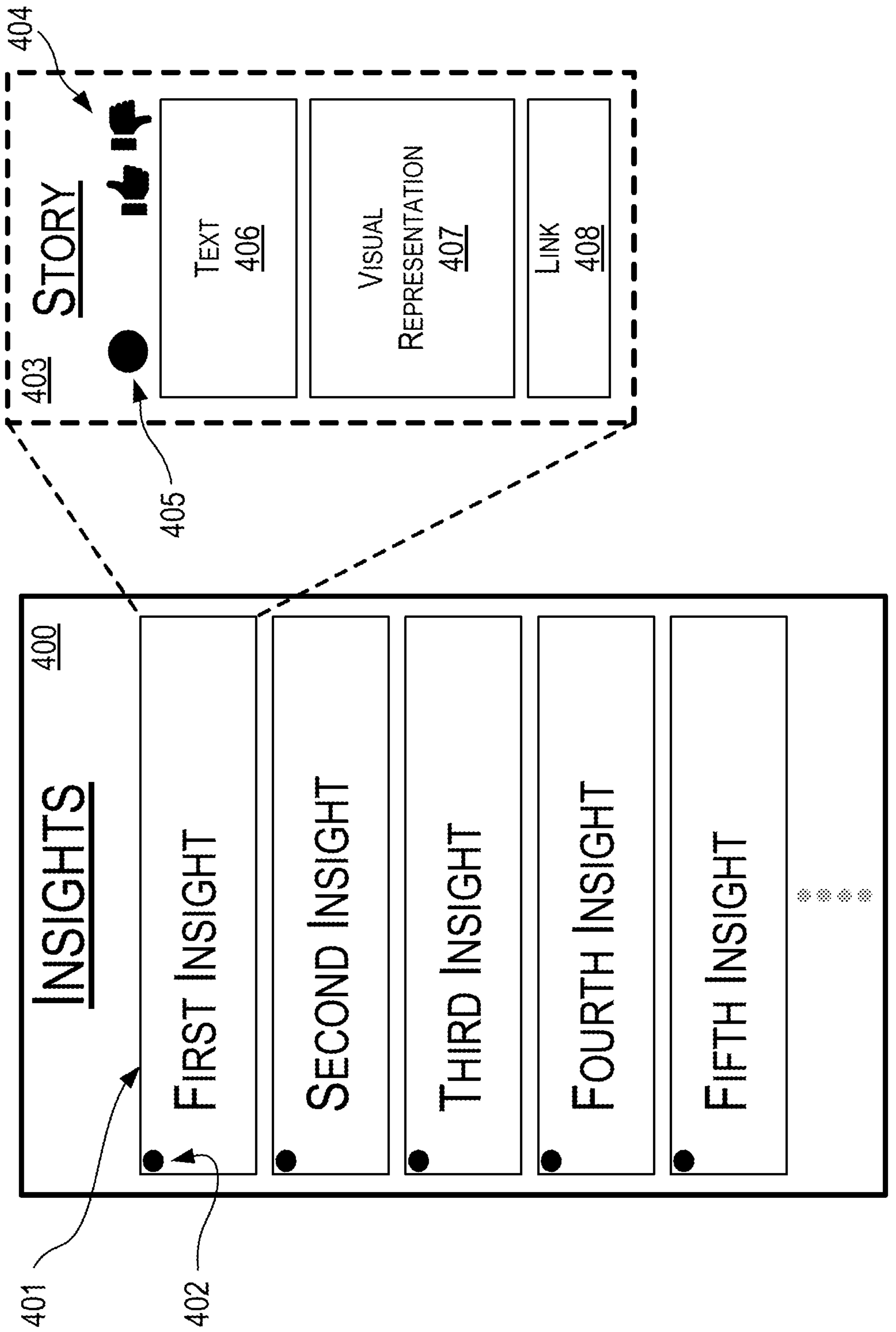
FIG. 4 shows another example of a graphical user interface according to some aspects of the present disclosure.

FIG. 4 shows another example of a graphical user interface according to some aspects. As shown in FIG. 4, the graphical user interface includes insight listings 400. In some examples, insight listings 400 may be referred to as an insight hub. Each of the insight listings 400, such as first insight listing 401, corresponds to a particular insight, such as an insight presented in a slide of an image carousel. For example, as discussed above, a generated graphical user interface may include an image carousel 200 including slides 210, 220, 230, 240 with each slide of the image carousel 200 including a template 201 populated with information in fields 202, 203, 204 associated with a selected insight. One or more of the slides of the image carousel 200 may also include a "view all" link for viewing all insights. The "view all" link may alternatively be positioned elsewhere in the graphical user interface. Either way, in response to user input selecting the "view all" link, the insights for multiple slides (e.g., all of the slides) can be viewed concurrently as insight listings in a single page, for example as insight listings 400 of FIG. 4.

Each insight listing, such as first insight listing 401, may include text describing the insight corresponding to the respective listing, an indicator 402 for providing an indication of whether the respective insight is new (e.g., it was received within a recent predetermined period of time such as within the past two days) or has been viewed by the user, or any combination of these. In some examples, the text describing the insight may be a label, such as "First Insight" for the first insight listing 401. In other examples, the text describing the insight may also be the text that is generated to populate the text field, such as text field 202, in a template for any particular slide. The text can be any text that identifies or otherwise provides an indication that an insight listing corresponds to a particular insight. The indicator 402 can provide the indication using any suitable technique, such as by changing or presenting an icon, by changing in color/hue, or by disappearing.

In some examples, a user can select an insight listing, such as the first insight listing 401, and the graphical user interface can responsively display a corresponding slide, such as slide 210, for the insight. In some examples, the graphical user interface can display the corresponding slide after an insight listing is selected for a predetermined period of time (e.g., two seconds). In some examples, the graphical user interface can re-display the insight listings 400 after the corresponding slide has been displayed for another predetermined period of time (e.g., thirty seconds). The slide may be displayed in an image carousel along with other slides 220, 230, 240, etc. for the other insights of the insight listing. In this way, a user may toggle between viewing slides in an image carousel that correspond to respective insights or viewing the insight listings for the respective insights.

In other examples, the user can select an insight listing, such as the first insight listing 401, and the graphical user interface can responsively display an insight story 403. In some examples, the graphical user interface can display the insight story 403 after an insight listing is selected for a predetermined period of time (e.g., two seconds). In some examples, the graphical user interface can re-display the insight listings 400 after the insight story 403 has been displayed for another predetermined period of time (e.g., thirty seconds). In some examples, as shown in FIG. 4, the graphical user interface can display the insight story 403 as a pop-up page that is overlaid on top of the page of insight listings 400. In other examples, the graphical user interface can display the insight story 403 in another graphical user page.

Each insight story 403 includes a text area 406 for inserting text that describes the insight corresponding to the selected insight listing, a visual representation area 407 for inserting a visual representation of the insight, and a link area 408 for inserting a link for accessing information related to the insight. Each insight story 403 can also include an indicator area 405 for displaying an indication of whether the story has been viewed by a user, whether the insight is a new insight, or both. In some examples, content for the text, visual representation, and link areas 406, 407, 408 may be generated similar to the manner in which content for the text, visual representation, and link fields 202, 203, 204 is generated for each template 201, as discussed above.

In some examples, each insight story 403 also includes a rating mechanism 403 for allowing the user to rate the insight. The rating mechanism 404 can include graphical options for providing a positive rating or a negative rating. In some examples, the rating mechanism may be binary and include graphical options like a thumbs up for a positive rating and a thumbs down for a negative rating. Upon selecting the positive rating option, a notification may be generated by the service provider and transmitted to the insight providing entity 101 for indicating to the insight providing entity 101 that the user approves the insight. Similarly, upon selecting the negative rating option, a notification may be generated by the service provider and transmitted to the insight providing entity 101 for indicating to the insight providing entity 101 that the user disapproves the insight. In this way, the insight providing entity 101 may use user approvals and disapprovals to improve insights. In some embodiments, upon selecting the negative rating option rating for a particular insight listing, the insight listing is removed from the insight listings 400. In other embodiments, upon selecting the negative rating option for the particular insight, the insight listing is not removed from the insight listings 400 and the user may be given an option to dismiss the insight. In other embodiments, upon selecting the negative rating option for the particular insight, the insight story 403 for the insight is deleted. In further embodiments, an insight listing that receives a negative rating may expire after a predetermined period of time after receiving the negative rating (e.g., 20-50 days). Of course, other rating icons and mechanisms, and actions to be taken in response to positive and negative ratings, are also possible. Icons representing the rating mechanism 404 are also not limited to thumbs up icons and thumbs down icons. Any icons representing user approval and disapproval may be used. The rating mechanism may also not be binary in other examples. For instance, the rating mechanism may include a set of stars or other icons for providing a rating along a non-binary scale. Upon the user submitting a rating, a notification may be generated by the service provider and transmitted to the insight providing entity 101 that indicates the rating.

Figure 5:
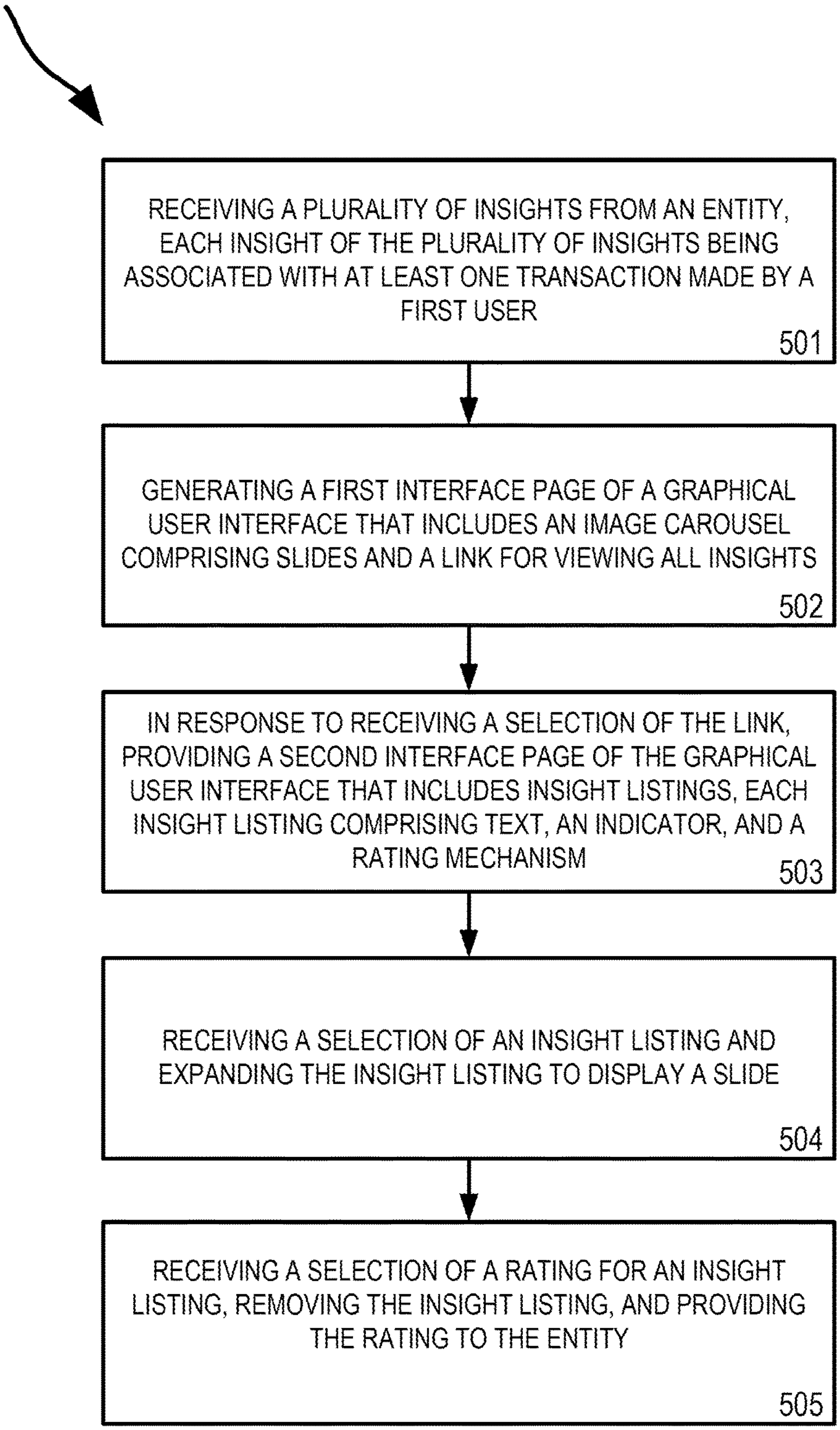
FIG. 5 shows an example of a process for automatically listing insights in an interactive list according to some aspects of the present disclosure.

FIG. 5 shows an example of a process 500 for automatically listing insights in an interactive list. In some examples, the process is implemented by the server 103 or another computing system, such as computing system 1100 as shown in FIG. 11. The process can be implemented in software or hardware or any combination thereof.

At block 501, insights are received by the service provider (e.g., by server 103) from an entity, such as insight providing entity 101, that is configured to generate the insights by analyzing transactions made by a first user. In some examples, each insight is associated with at least one transaction made by the first user.

At block 502, a first interface page of a graphical user interface is generated by the service provider. The first interface page includes an image carousel including slides, with each slide including a visual representation of a respective insight of the received insights. In some examples, the visual representation is included in a slide based on a corresponding template such as template 201. The first interface page also includes a link for viewing all insights of the plurality of insights. The visual representation of the respective insight includes a graphic characterizing information associated with the respective insight. For example, the graphic can include a chart or a visualization. The visual representation can be generated using any suitable technique, such as by analyzing an image provided in conjunction with the insight by the insight providing entity.

At block 503, a selection of the link for viewing all insights is received from the user. In response to receiving the selection, a second interface page of the graphical user interface is provided. The second interface page includes insight listings, such as insight listings 400. Each insight listing corresponds to a respective insight of the received insights and may include text describing the respective insight, an indicator of whether the respective insight has been viewed by the user, a rating mechanism for allowing the user to rate the respective insight, or any combination of these.

At block 504, a selection of an insight in the insight listings is received from the user. In response to receiving the selection, the insight listing is expanded to display a slide for the respective insight in the image carousel. This can allow the user to easily toggle between the insight listings and the image carousel.

At block 505, a selection of a rating for an insight listing in the insight listings is received from the user interacting with a rating mechanism in the insight listing. In response to receiving the selection, the insight listing is removed from the insight listings and the rating is provided to the entity by the service provider.

The graphical user interface pages described above form part of a graphical user interface. Although not shown, the graphical user interface includes other elements such as one or more buttons for navigating between the graphical user interface pages. For example, one or more buttons may be provided for switching between the graphical user interface pages of the image carousel 200 and the insight listings 400. In another example, one or more buttons may be provided for switching to other graphical user interface pages, such as the graphical user interface page 601 shown in FIG. 6.

Figure 6:
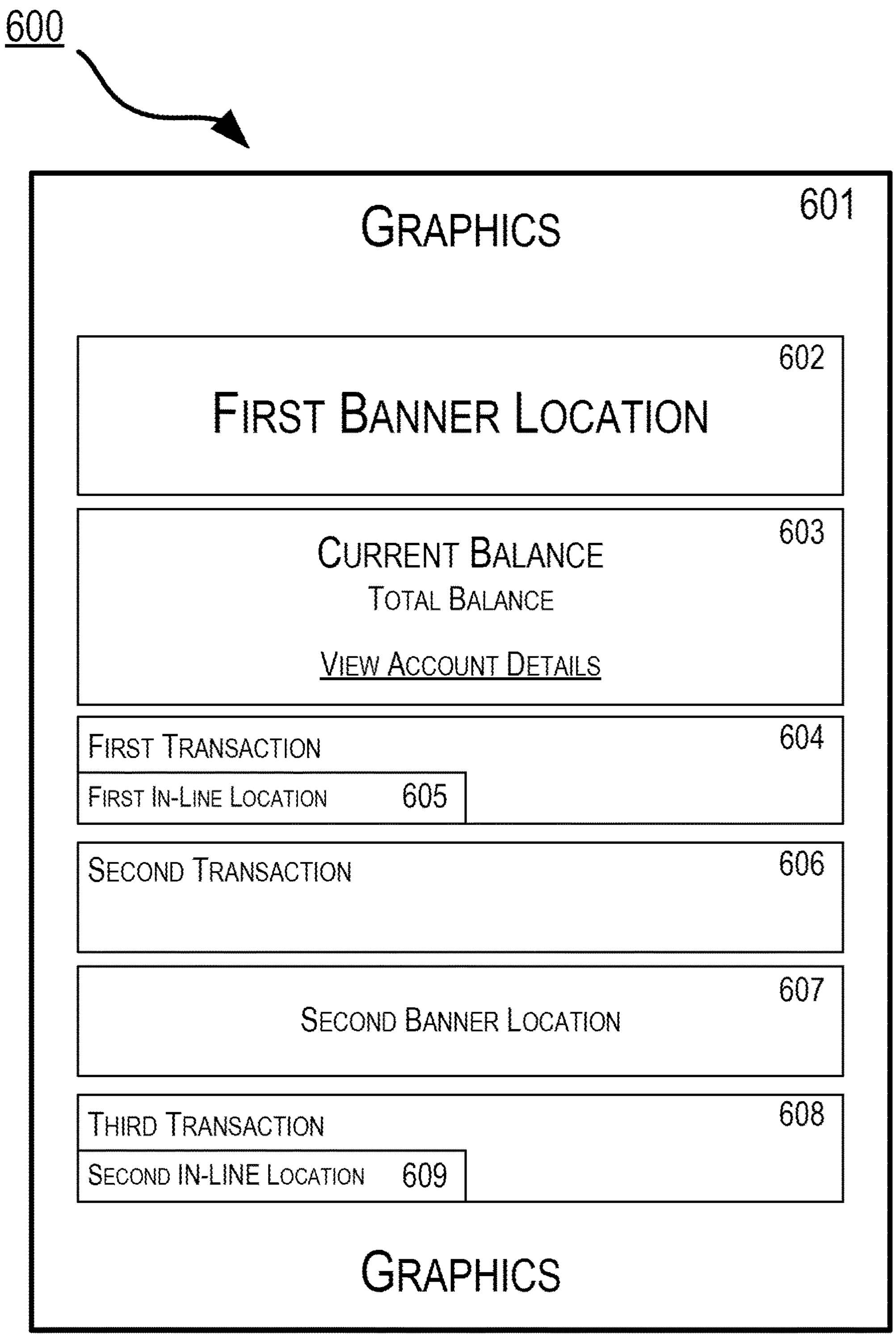
FIG. 6 shows another example of a graphical user interface according to some aspects of the present disclosure.

FIG. 6 shows another example of a graphical user interface 600 according to some aspects. The graphical user interface 600 includes a graphical user interface page 601 in which insights are spatially positioned at selected and predefined spatial locations. The graphical user interface page 601 includes predefined spatial locations 602, 605, 607, and 609 including a first banner location for a first banner having a first predetermined size, a second banner location for a second banner having a second predetermined size smaller than the first predetermined size, a first in-line location for first in-line text, and a second in-line location for second in-line text. Insights can be selected and positioned in some or all of these predefined spatial locations, as will be described in greater detail below.

The graphical user interface page 601 further includes graphics areas at the top and bottom of the page, a first banner area below the graphics at the top of the page, and a transaction listing area that includes transaction listings 604, 606, 608 above graphics at the bottom of the page. Between the transaction listing area is an account status banner 603 for showing a current balance of an account, the total balance of the account, and a link for viewing account details. Although not shown, the graphical user interface page 601 can include additional banner areas and other areas, such as an account information area. As further shown in FIG. 6, the first banner location corresponds to a first banner area, the second banner location corresponds to a second banner area, the first in-line location corresponds to a first transaction listing 604 of the plurality of transaction listings, and the second in-line location corresponds to a third transaction listing 608 of the plurality of transaction listings. Although not shown, the graphical user interface page 601 can include additional banner areas and other areas, such as an account information area. Insights may or may not be allowed to be positioned in those additional and other areas, depending on the configuration of the system.

The predefined spatial locations 602, 605, 607, 609 are for positioning and displaying insights. One or more insights can be displayed in each predefined spatial location. For example, a different insight can be displayed in each of predefined spatial locations 602, 605, 607, 609. Alternatively, or additionally, the insights can be displayed in some of the predefined spatial locations 602, 605, 607, 609. For example, different insights can be displayed in predefined spatial location 602 and in predefined spatial location 609 while no insights are displayed in predefined spatial locations 605, 607. Spatial locations for displaying insights can be selected based on a predefined set of rules and the insights. For example, a rule may specify that the first, third, and fifth insights are permitted to be displayed only in the first banner location 602. In another example, a rule may specify that Insights A and B may be permitted to be displayed in just the first banner location 602 and Insights C, D, and E may be permitted to be displayed in just the first and second in-line locations 605, 609, respectively. The selection may be made with an insight selection engine, an example of which is shown in FIG. 7.

Figure 7:
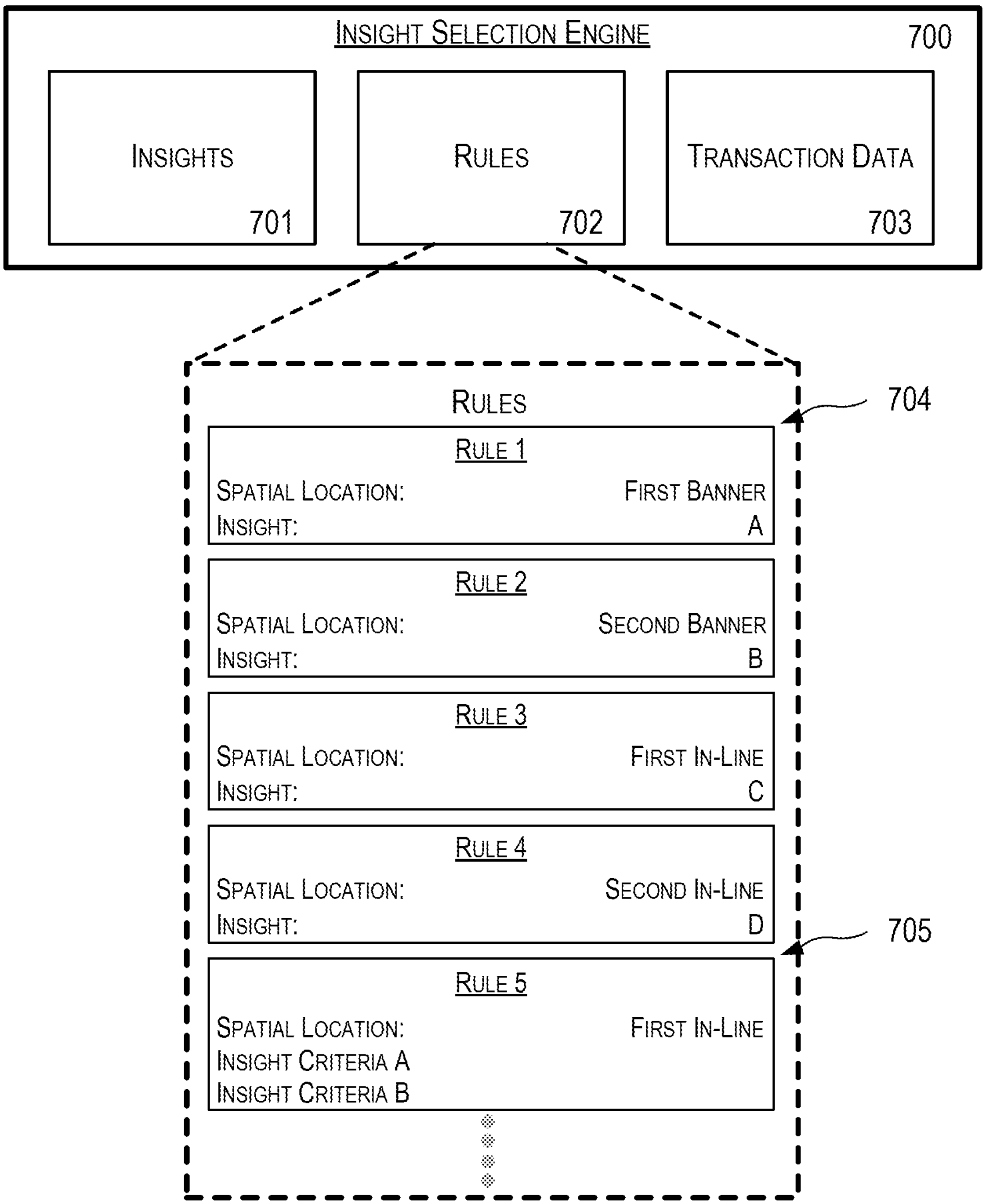
FIG. 7 shows an example configuration of an insight selection engine according to some aspects of the present disclosure.

Referring now to FIG. 7, shown is an example of an insight selection engine 700 that uses the insights 701 and rules 702 to select where to position an insight in a graphical user interface page. The insight selection engine 700 may also use transaction data 703 to make the selection in some examples. The rules 702 can include any number of rules, such as Rules 1-5. The rules 702 may include different rule definitions. The rule definitions can map insights to one or more predesignated spatial locations within a graphical user interface page.

In some examples, a rule definition for Rule 1 704 provides that Insight A may be displayed just in the first banner location 602. Similarly, a rule definition for Rule 2 provides that Insight B may be displayed just in the second banner location 607. Using these rule definitions, certain insights may be displayed in certain spatial locations. In some examples, a rule definition for one of the rules 702 may refer to one or more pieces of transaction data, such as transaction data 104. For example, a rule definition may specify an insight location; a transaction type; and a transaction amount. An insight that is associated with transaction data that matches the rule's transaction data may be positioned at the spatial location identified by the rule. Rule definitions may provide for different insights to be placed in the same spatial location and for the same insights to be placed in different spatial locations.

In some examples, a rule definition for Rule 5 705 specifies that any insights having one or more characteristics that satisfy a first criteria ("Criteria A") and any insights having one or more characteristics that satisfy a second criteria ("Criteria B") may be displayed just in the first in-line location 605.

Figure 8:
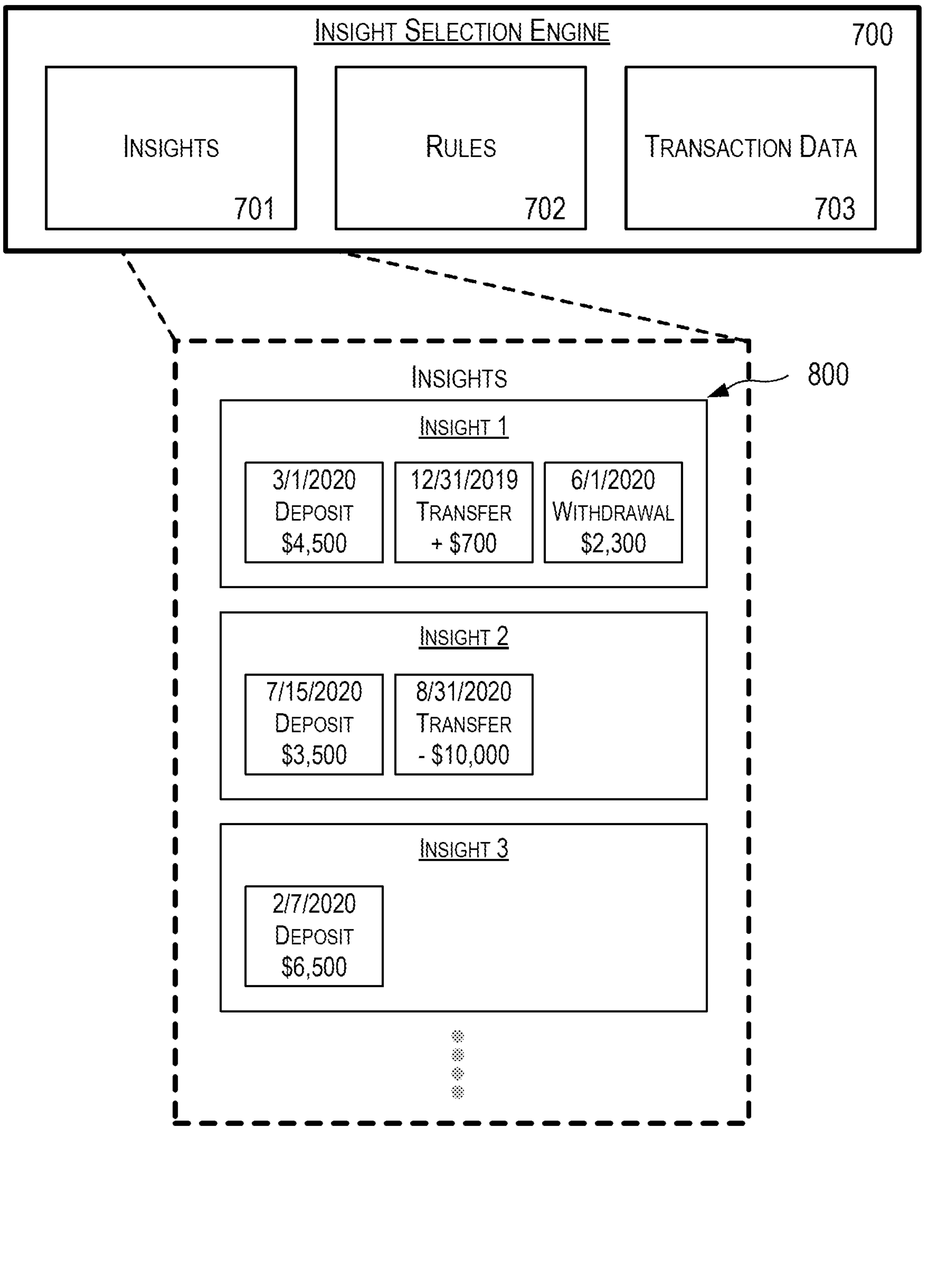
FIG. 8 shows another example configuration of an insight selection engine according to some aspects of the present disclosure.

For example, as shown in FIG. 8, Insight 1 800 is characterized as being associated with three transactions: a deposit transaction, a transfer transaction, and a withdrawal transaction. Insight 1 800 is associated with each transaction based on transaction data 703 for the respective transaction. For the deposit transaction, the transaction data 703 indicates the type of transaction, a transaction date, and a transaction amount. This information may be compared to rule criteria to determine a spatial location in which to position Insight 1 800. Similarly, for the transfer and withdrawal transactions, the transaction data 703 can indicate the type of transaction, a transaction date, and a transaction amount as criteria. This information may additionally or alternatively be compared to rule criteria to determine a spatial location in which to position Insight 1 800.

Each insight may be associated with a single transaction or several transactions. For example, as shown in FIG. 8, Insight 2 is associated with two transactions and Insight 3 is associated with one transaction. It will be appreciated that any number of transactions may be associated with each insight. By applying the characteristics of each insight against the criteria in the rules, an insight satisfying the rule definition for Rule 5 may be selected and a spatial location for the insight may be determined. In this case, any insights satisfying the rule definition for Rule 5 may be displayed in the first in-line location 605.

In some examples, the characteristics of each insight may be included in metadata and other data provided with the insight by the insight providing entity 101. In some examples, the characteristics of each insight may be generated for each insight by the server 103. As discussed above, such characteristics include information about the transaction or transactions used to generate the insight. For example, the transaction data and characteristics for each insight can include information indicating a transaction type, a transaction amount, a transaction date, information identifying one or more users associated with the transaction, and information identifying one or more accounts associated with the transaction, and a priority score for the transaction. In some examples, the characteristics of each insight may provide an indication of criticality of the insight that is based on the priority score and transactions performed since the insight was generated. In other examples, the characteristics of each insight may provide an indication of relevance (e.g., a relevance score) based on user feedback for the insight such as feedback received when the insight is presented in the insight listings 400, as described above.

The rules 702 can include any number and combination of criteria for use in matching insights to spatial locations in the graphical user interface page. Such criteria may include, for example, a name of an insight, information identifying the insight, users and accounts associated with the insight, and transaction data associated with the insight. In some examples, the criteria may include any of the information about the transactions or transactions used to generate the characteristics for each insight. In this way, characteristics for each insight can be compared and matched to the criteria of a rule definition.

In some examples, based on the characteristics for each insight, a spatial location for the insight can be determined based on artificial intelligence and/or machine learning techniques. For example, server 103 may include one or more machine-learning models (e.g., neural networks, classifiers, support vector machines, etc.) that are trained to perform the matching. In some examples, the one or more machine-learning models can be configured to receive characteristics of an insight as input, select a spatial location for the insight based on the characteristics, and provide the selected spatial location as output. The machine-learning mode can be trained to make such selections based on training data. The training data can include characteristics of previous insights placed in various spatial locations and user interaction data, where the user interaction data can include information about user interactions with the insights. The user interaction data may be associated with a single user's interactions with one or more previous insights or multiple users' interactions with one or more previous insights. In some examples, the one or more machine-learning models can be trained by applying supervised learning using training data that includes labeled observations, where each labeled observation includes an insight with various characteristics correlated to a target spatial location for the insight.

In some examples, the server 103 may track which insights are placed in each spatial location, how many times an insight has been placed in the same spatial location, how long the insight has been placed in that spatial location, and the like. In some examples, the server 103 may track user interactions with the graphical user interface pages. For example, the server 103 may record which insights a user is interacting with, how long the user has interacted with that insight, what actions the user takes in response to viewing the insight, and other user interaction data. Using the tracking data, the one or more machine-learning models may be trained and/or further trained.

Alternatively, or additionally, the characteristics for each insight can be matched to the criteria of the rule definition based on the artificial intelligence and/or machine learning techniques described above. In some examples, the rules 702 may be modified based on the selection. For example, if the one or more machine-learning models select certain insights for placement in certain spatial locations, server 103 may generate a new rule that specifies placement locations for those types of insights.

Alternatively, or additionally, the selection of insights for positioning can be made based on a set of user customizations. For example, a service provider may receive a set of user customizations from a client device of a user. An example of the service provider can be a financial institution, such as a bank. The set of user customizations may be for controlling which insights are displayed within a graphical user interface of the client device. The user customizations can be used to filter which insights are ultimately displayed to the user. For example, the service provider may acquire insights from the insight providing entity 101. In some examples, the service provider may only request insights from the insight providing entity 101 that are approved by the user via the user customizations, so as to avoid wasting computing resources on obtaining superfluous insights that will ultimately be excluded from the interface. Alternatively, the service provider may request a full set of insights from the insight providing entity 101 and then subsequently filter them based on the user customizations. In some such examples, each of the insights may relate to transactions that have been facilitated by the service provider for the user. Based on the user customizations and the rules 702, certain insights may be selected from the received insights. For example, as shown in FIG. 7, an insight may be initially selected based on the criteria for the insight satisfying a first criteria ("Criteria A") or a second criteria ("Criteria B") of the rule definition for Rule 5 705 and a user customization may subsequently exclude the insight. In this way, insights may be selected based on a predefined set of rule definitions and user customizations. In some examples, a first set of insights may be selected based on the predefined set of rules and a second subset of insights may selected from the set of insights based on a set of user customizations. For example, a set of user customizations may specify an insight involving a desired transaction type and a range of transaction amounts for the desired transaction type. So, a subset of insights may be selected based on the at least one transaction type and a transaction amount falling within the range transaction amounts.

Additionally, the service provider may select certain insights to be included in rule definitions. Alternatively, or additionally, the service provider may also provide default rule definitions that a user may customize. For example, the set of user customizations may add new rules to an existing set of rules 702 and/or remove rules from the existing set of rules 702. The set of user customizations may additionally or alternatively modify default rules in the existing set of rules 702. For example, the graphical user interface page may be provided with options for adding, removing, and/or modifying the rules 702. In some embodiments, the set of user customizations may add additional insights that do not satisfy any of the rules 702. For example, a user may select insights from the set of insights for placement in the graphical user interface page in one of the spatial locations even though the characteristics of the selected insights do not satisfy any rules of rules 702. In this way, the user can override the rules and customize insight placement as desired.

Figure 9:
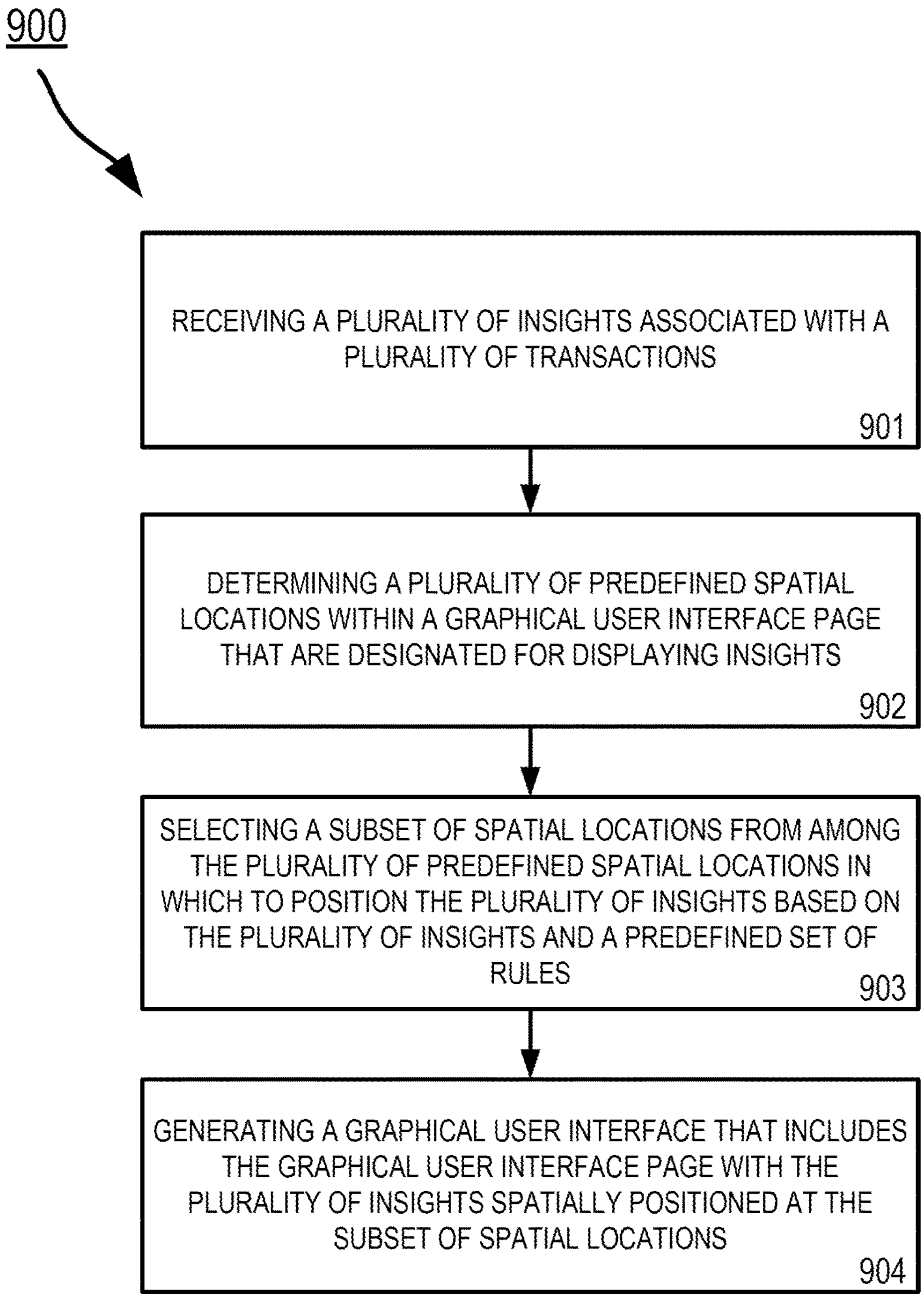
FIG. 9 shows an example of a process for automatically positioning an insight in a spatial location of a graphical user interface page based on rules according to some aspects of the present disclosure.

FIG. 9 shows an example of a process 900 for automatically positioning an insight in a spatial location of a graphical user interface page based on rules according to some aspects. In some examples, the process is implemented by the server 103 or another computing system, such as computing system 1100 as shown in FIG. 11. The process can be implemented in software or hardware or any combination thereof.

At block 901, insights are received by the service provider (e.g., by server 103) from an entity, such as insight providing entity 101. The insights may be associated with transactions. In some examples, each insight is associated with at least one transaction made by a first user.

At block 902, predefined spatial locations within a graphical user interface page are determined for displaying insights. The predefined spatial locations can be predesignated for displaying the insights. The spatial locations may include a first banner location for a first banner, a second banner location for a second banner, a first in-line location for first in-line text, and a second in-line location for second in-line text. The graphical user interface page may include graphics, a first banner area, a second banner area, and transaction listing area that includes transaction listings for the transactions. The first banner location may be coterminous with the first banner area, the second banner location may be coterminous with the second banner area, the first in-line location corresponds to a first transaction listing, and the second in-line location corresponds to a third transaction listing of the plurality of transaction listings.

At block 903, a subset of spatial locations from among the predefined spatial locations in which to position the plurality of insights is selected based on the insights and a predefined set of rules. Each insight may correspond to one or more rules of the predefined set of rules. Each rule may specify a predefined spatial location for the respective insight based on the respective insight being of a certain type or having certain other characteristics. For example, a rule can specify that an insight that has one or more characteristics matching one or more predefined criteria is to be positioned in a particular spatial location.

At block 904, a graphical user interface is generated, where the graphical user interface includes a graphical user interface page (e.g., graphical user interface page 601) that has the insights spatially positioned at the selected subset of spatial locations.

Figure 10:
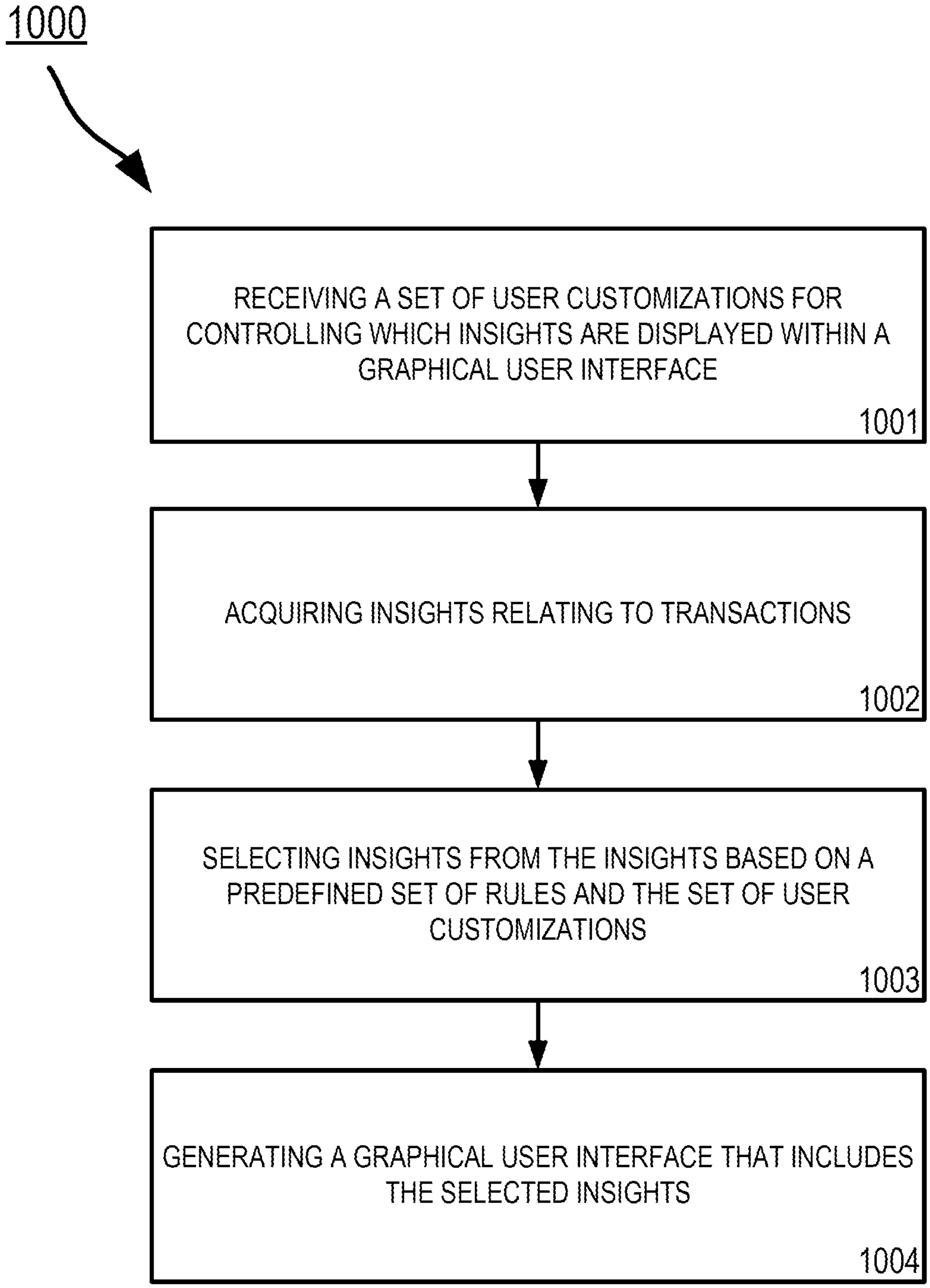
FIG. 10 shows an example of a process for automatically positioning an insight in a spatial location of a graphical user interface page based on rules according to some aspects of the present disclosure.

FIG. 10 shows an example of a process 1000 for automatically positioning an insight in a spatial location of a graphical user interface page based on rules according to some aspects. In some examples, the process is implemented by the server 103 or another computing system, such as computing system 1100 as shown in FIG. 11. The process can be implemented in software or hardware or any combination thereof.

At block 1001, a set of user customizations for controlling which insights are displayed within a graphical user interface are received by a service provider and from a client device of a user. The set of user customizations may also control where the insights are to be displayed in the graphical user interface. For example, a user may specify that a certain insight is to be positioned at a particular spatial location within a graphical user interface that is different from a default position for the insight in the graphical user interface.

At block 1002, insights are acquired from an entity that is separate from the service provider. The insights can be received by the service provider (e.g., by server 103) from an entity, such as insight providing entity 101. The insights can be associated with transactions and can relate to transactions facilitated by the service provider for the user. Each insight can be associated with at least one transaction made by the user.

At block 1003, a set of insights is selected from among the received insights based on a predefined set of rules and the set of user customizations. The set of insights may be selected based on the predefined set of rules, and a subset of the set of insights may be further selected based on the set of user customizations. Each rule of the predefined set of rules can include a rule definition specifying an insight location, a transaction type, a transaction amount, or any combination of these. Examples of the transaction type can include a deposit transaction, a withdrawal transaction, and a transfer transaction. At least one transaction associated with an insight can correspond to a transaction type or transaction amount that satisfies rule criteria. In some embodiments, the set of user customizations specifies a transaction type and a transaction amount for the transaction type. A subset of insights can then be selected from among the set of insights based on their transaction type and the transaction amount matching the user customizations.

At block 1004, a graphical user interface is generated that includes the set of insights selected from among the plurality of insights. In some embodiments, the graphical user interface may include the graphical user interface page 601.

It will be appreciated that although some examples described above relate to presenting insights to a user in a graphical user interface page, similar techniques and concepts can be used with respect to other types of information. For example, similar techniques can be applied to select spatial locations within a graphical user interface page at which to position other types of information, such as message, reminders, advertisements, etc. These selections may be made based on rules, machine learning, and/or other techniques described above. As one particular example, one or more welcome messages may be generated that appear the first time a user accesses a feature provided by the service provider. In another example, one or more promotional messages may be generated to promote a certain product offered by the service provider. In some examples, one or more messages may be generated based on third-party content. For example, server 103 may acquire one or more data points while one or more users are navigating among the graphical user interface pages, transfer those one or more data points to a third-party content provider, receive content from the third-party content provider, and generate messages based on the received third-party content. In further examples, messages may be generated based on action performed by the service provider. For example, a message can be generated if the service provider has mailed an item (e.g., a new membership card) to the user. The messages may serve to remind the user to take other actions based on the mailed item (e.g., update other accounts).

FIG. 11 shows an example of a computing system 1100 according to some aspects. For example, the computing system 1100 can serve as the server 103 and/or the user device 109 of FIG. 1.

The computing system 1100 includes one or more processors 1101, one or more memories 1102, RAM 1103, one or more storage devices 1304, network interface 1105, and display 1106. The one or more processors 1101 can read one or more programs from the one or more memories 1102 and execute them using RAM 1103. Non-limiting examples of the one or more processors 1101 include a Field-Programmable Gate Array (FPGA), an application-specific integrated circuit (ASIC), a microprocessor, or any combination of these. The one or more processors 1101 can execute the one or more programs stored in the one or more memories 1102 to perform operations. Examples of such operations can include any of the operations described above with respect to the server 103 and/or user device 109. In some examples, the one or more programs can include processor-specific instructions generated by a compiler or an interpreter from code written in any suitable computer-programming language, such as C, C++, C #, Python, or Java.

The one or more memories 1102 can be non-volatile and may include any type of memory device that retains stored information when powered off. Non-limiting examples of the memory 1102 include electrically erasable and programmable read-only memory (EEPROM), flash memory, or any other type of non-volatile memory. At least some of the memory device can include a non-transitory computer-readable storage medium from which the one or more processors 1101 can read instructions. A computer-readable storage medium can include electronic, optical, magnetic, or other storage devices capable of providing the one or more processors 1101 with computer-readable instructions or other program code. Non-limiting examples of a computer-readable storage medium include magnetic disks, memory chips, ROM, random-access memory (RAM), an ASIC, a configured processor, optical storage, or any other medium from which a computer processor can read the instructions. The one or more programs may be configured to present insights to one or more users. In some embodiments, the one or more programs are configured to present insights on display 1106. In some embodiments, the one or programs are configured to present insights in an image carousel as shown in FIGS. 2 and 3, present insights in a list as shown in FIGS. 4 and 5, and present insights based on rules and user customization as shown in FIGS. 6-10. In some embodiments, the one or more programs are configured to store and manage transaction data for one or more users, insights about transactions involving the one or more users, templates used in generating graphical user interface pages for presenting information related to the insights and the transactions to the one or more users, and rules for determining how the information related to the insights should be placed on the graphical user interface pages. The one or more programs may also be configured to generate a graphical user interface and pages therein based on insights, templates, and rules, as well as organize the graphical user interface pages.

One or more storage devices 1104 may be configured to store insight data, transaction data, template data, and rules data. The one or more storage devices 1104 may further be configured to store graphical user interface pages. Additionally, the network interface 1105 may output the insight data, transaction data, template data, and rules data to one or more networks. Display 1106 may be configured to display images, screens, and interfaces. In some embodiments, display 1106 is configured to display graphical user interface pages that present insights in accordance with the features described above. In some embodiments, using the display 1106 and a rating mechanism, one or more users provide feedback on the insights. Such feedback may be used to improve the insight presentation.

The computing system 1100 may also include other input and output (I/O) components. Examples of such input components can include a mouse, a keyboard, a trackball, a touch pad, and a touch-screen display. Examples of such output components can include the display 1106, an audio display, and a haptic display. Examples of the display 1106 can include a liquid crystal display (LCD), a light-emitting diode (LED) display, and a touch-screen display. An example of an audio display can include speakers. Examples of a haptic display may include a piezoelectric vibration device or an eccentric rotating mass (ERM) device.

The systems and methods of the present disclosure may be implemented using hardware, software, firmware, or a combination thereof and may be implemented in one or more computer systems or other processing systems. Some embodiments of the present disclosure include a system including one or more processors. In some embodiments, the system includes a non-transitory computer readable storage medium containing instructions which, when executed on the one or more processors, cause the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the following description to provide a thorough understanding of the embodiments.

However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:

receiving, by a processor of a service provider, a plurality of insights from an entity, wherein each insight of the plurality of insights is generated from an analysis of a user's historical financial transaction data;

accessing, by the processor of the service provider, a plurality of templates, each respective template of the plurality of templates defining fields that are spatially positioned within the respective template;

retrieving, by the processor of the service provider, a specific template from the plurality of templates for each respective insight of the plurality of insights based on one or more characteristics of the respective insight;

generating, by the processor of the service provider, a plurality of populated templates for the plurality of templates, wherein each respective populated template of the plurality of populated templates is generated by inserting a graphic representing a respective insight of the plurality of insights into a field of the specific template retrieved for that respective insight and inserting text describing the respective insight into another field of that specific template;

determining, in a graphical user interface, a plurality of predefined spatial locations designated for displaying insights, wherein the plurality of predefined spatial locations comprises a first banner location for displaying a first banner of a first predetermined size, a second banner location for displaying a second banner of a second predetermined size smaller than the first banner location, a first in-line location for displaying first in-line text adjacent to a first transaction listing, and a second in-line location for displaying second in-line text adjacent to a third transaction listing;

for each respective insight of the plurality of insights, selecting a specific spatial location from among the plurality of predefined spatial locations in which to position the respective insight by executing an insight selection engine, wherein the insight selection engine selects the specific spatial location by applying a predefined set of rules that maps one or more characteristics of the respective insight to a corresponding predefined spatial location, the one or more characteristics comprising at least a transaction type and a transaction amount derived from the user's historical financial transaction data, wherein the selection of the specific spatial location by the insight selection engine is further based on an output from a machine-learning model that has been trained using historical user interaction data with previously positioned insights to predict a spatial location that will maximize user engagement;

filtering the plurality of insights to generate a subset of insights by applying a set of user customizations received from a client device, the user customizations specifying at least one desired transaction type to be displayed;

generating, by the processor of the service provider, the graphical user interface by: i) inserting the plurality of populated templates into a plurality of slides such that each respective slide of the plurality of slides comprises a respective populated template of the plurality of populated templates; ii) spatially positioning only the subset of insights at the specific spatial locations selected for each insight by the insight selection engine; or iii) a combination of i) and ii); and providing, by the processor of the service provider, the graphical user interface to the client device communicatively coupled to the service provider.

2. The method of claim 1, wherein the plurality of insights is associated with a plurality of financial transactions identified in the user's historical financial transaction data and facilitated by the service provider, and wherein each insight of the plurality of insights comprises a visual representation of a financial transaction associated with the respective insight and a textual representation of the financial transaction.

3. The method of claim 1, wherein each template of the plurality of templates comprises a text field for inserting text that describes an insight of the plurality of insights, a visual representation field for inserting a graphic that visually represents the insight, and a link field for inserting a link for accessing information related to the insight, and wherein each respective populated template of the plurality of populated templates is further generated by inserting a link for accessing information related to the respective insight into the link field of the respective template.

4. The method of claim 1, wherein generating the graphical user interface comprises option i) or iii), and wherein each respective slide of the plurality of slides further comprises a respective indicator area for indicating whether the respective slide has been previously viewed.

5. The method of claim 1, wherein generating the graphical user interface comprises option i) or iii), and wherein each respective slide of the plurality of slides further comprises a respective indicator for indicating a slide number among a total number of slides for the respective slide.

6. The method of claim 1, wherein generating the graphical user interface comprises option i) or iii), and wherein generating the graphical user interface comprises arranging the plurality of slides as thumbnails on a graphical user interface page of the graphical user interface.

7. The method of claim 1, wherein generating the graphical user interface comprises option i) or iii), and wherein the graphical user interface comprises an image carousel, and wherein generating the graphical user interface comprises arranging the plurality of slides in the image carousel.

8. The method of claim 1, wherein each specific template retrieved from the plurality of templates comprises at least a text field, a visual representation field, and a link field, and wherein generating each respective populated template of the plurality of populated templates further comprises:

inserting a visual representation of the respective insight, the visual representation comprising a graphic that includes a chart characterizing financial data associated with the respective insight, into the visual representation field of the specific template retrieved for that respective insight; and inserting a selectable uniform resource locator for accessing additional information related to the respective insight into the link field of that specific template; and wherein the method further comprises:

arranging the plurality of populated templates as a plurality of slides within an image carousel on a first interface page of the graphical user interface, wherein each respective slide further comprises an indicator area for displaying an indication of whether the respective slide has been previously viewed by a second user associated with a joint financial account;

providing, on the first interface page, a selectable "view all" link;

in response to receiving a user selection of the "view all" link, generating and providing a second interface page comprising an insight hub that includes a plurality of insight listings corresponding to the plurality of insights, wherein each insight listing is associated with an indicator that indicates whether the respective insight is new;

in response to receiving a user selection of a particular insight listing from the insight hub, displaying an insight story as an overlaid pop-up page that includes a rating mechanism comprising at least a selectable thumbs-down icon for providing a negative rating; and in response to receiving the negative rating for the insight corresponding to the particular insight listing via the selection of the thumbs-down icon, removing the particular insight listing from the insight hub and transmitting data corresponding to the negative rating to the entity that provided the plurality of insights.

9. The method of claim 1, further comprising:

tracking user interactions with the graphical user interface, the user interactions comprising at least a duration of time the user interacted with a specific insight and one or more specific actions the user took in response to viewing the specific insight; and further training the machine-learning model using the tracked user interactions to refine the prediction of spatial locations.

10. A system comprising:

one or more processors; and one or more computer-readable storage media storing instructions which, when executed by the one or more processors, cause the system to perform operations including:

receiving a plurality of insights from an entity, wherein each insight of the plurality of insights is generated from an analysis of a user's historical financial transaction data;

accessing a plurality of templates, each respective template of the plurality of templates defining fields that are spatially positioned within the respective template;

retrieving a specific template from the plurality of templates for each respective insight of the plurality of insights based on one or more characteristics of the respective insight;

generating a plurality of populated templates for the plurality of templates, wherein each respective populated template of the plurality of populated templates is generated by inserting a graphic representing a respective insight of the plurality of insights into a field of the specific template retrieved for that respective insight and inserting text describing the respective insight into another field of that specific template;

determining, in a graphical user interface, a plurality of predefined spatial locations designated for displaying insights, wherein the plurality of predefined spatial locations comprises a first banner location for displaying a first banner of a first predetermined size, a second banner location for displaying a second banner of a second predetermined size smaller than the first banner location, a first in-line location for displaying first in-line text adjacent to a first transaction listing, and a second in-line location for displaying second in-line text adjacent to a third transaction listing;

for each respective insight of the plurality of insights, selecting a specific spatial location from among the plurality of predefined spatial locations in which to position the respective insight by executing an insight selection engine, wherein the insight selection engine selects the specific spatial location by applying a predefined set of rules that maps one or more characteristics of the respective insight to a corresponding predefined spatial location, the one or more characteristics comprising at least a transaction type and a transaction amount derived from the user's historical financial transaction data, wherein the selection of the specific spatial location by the insight selection engine is further based on an output from a machine-learning model that has been trained using historical user interaction data with previously positioned insights to predict a spatial location that will maximize user engagement;

filtering the plurality of insights to generate a subset of insights by applying a set of user customizations received from a client device, the user customizations specifying at least one desired transaction type to be displayed;

generating the graphical user interface by: i) inserting the plurality of populated templates into a plurality of slides such that each respective slide of the plurality of slides comprises a respective populated template of the plurality of populated templates; ii) spatially positioning only the subset of insights at the specific spatial locations selected for each insight by the insight selection engine; or iii) a combination of i) and ii); and providing the graphical user interface to the client device communicatively coupled to a service provider.

11. The system of claim 10, wherein the plurality of insights is associated with a plurality of financial transactions identified in the user's historical financial transaction data and facilitated by the service provider.

12. The system of claim 10, wherein each respective populated template of the plurality of populated templates is further generated by inserting a link for accessing information related to the respective insight into a link field of the respective template.

13. The system of claim 10, wherein generating the graphical user interface comprises option i) or iii), and wherein each respective slide of the plurality of slides further comprises a respective indicator area for indicating whether the respective slide has been previously viewed.

14. The system of claim 10, wherein generating the graphical user interface comprises option i) or iii), and wherein each respective slide of the plurality of slides further comprises a respective indicator for indicating a slide number among a total number of slides for the respective slide.

15. The system of claim 10, wherein generating the graphical user interface comprises option i) or iii), and wherein generating the graphical user interface comprises arranging the plurality of slides as thumbnails on a graphical user interface page of the graphical user interface.

16. A non-transitory computer-readable medium storing instructions that, when executed by one or more processors, cause a system to perform operations comprising:

receiving a plurality of insights from an entity, wherein each insight of the plurality of insights is generated from an analysis of a user's historical financial transaction data;

accessing a plurality of templates, each respective template of the plurality of templates defining fields that are spatially positioned within the respective template;

retrieving a specific template from the plurality of templates for each respective insight of the plurality of insights based on one or more characteristics of the respective insight;

generating a plurality of populated templates for the plurality of templates, wherein each respective populated template of the plurality of populated templates is generated by inserting a graphic representing a respective insight of the plurality of insights into a field of the specific template retrieved for that respective insight and inserting text describing the respective insight into another field of that specific template;

determining, in a graphical user interface, a plurality of predefined spatial locations designated for displaying insights, wherein the plurality of predefined spatial locations comprises a first banner location for displaying a first banner of a first predetermined size, a second banner location for displaying a second banner of a second predetermined size smaller than the first banner location, a first in-line location for displaying first in-line text adjacent to a first transaction listing, and a second in-line location for displaying second in-line text adjacent to a third transaction listing;

for each respective insight of the plurality of insights, selecting a specific spatial location from among the plurality of predefined spatial locations in which to position the respective insight by executing an insight selection engine, wherein the insight selection engine selects the specific spatial location by applying a predefined set of rules that maps one or more characteristics of the respective insight to a corresponding predefined spatial location, the one or more characteristics comprising at least a transaction type and a transaction amount derived from the user's historical financial transaction data, wherein the selection of the specific spatial location by the insight selection engine is further based on an output from a machine-learning model that has been trained using historical user interaction data with previously positioned insights to predict a spatial location that will maximize user engagement;

filtering the plurality of insights to generate a subset of insights by applying a set of user customizations received from a client device, the user customizations specifying at least one desired transaction type to be displayed;

generating the graphical user interface by: i) inserting the plurality of populated templates into a plurality of slides such that each respective slide of the plurality of slides comprises a respective populated template of the plurality of populated templates; ii) spatially positioning only the subset of insights at the specific spatial locations selected for each insight by the insight selection engine; or iii) a combination of i) and ii); and providing the graphical user interface to the client device communicatively coupled to a service provider.

17. The non-transitory computer-readable medium of claim 16, wherein the plurality of insights is associated with a plurality of financial transactions identified in the user's historical financial transaction data and facilitated by the service provider.

18. The non-transitory computer-readable medium of claim 16, wherein each respective populated template of the plurality of populated templates is further generated by inserting a link for accessing information related to the respective insight into a link field of the respective template.

19. The non-transitory computer-readable medium of claim 16, wherein generating the graphical user interface comprises option i) or iii), and wherein each respective slide of the plurality of slides further comprises a respective indicator area for indicating whether the respective slide has been previously viewed.

20. The non-transitory computer-readable medium of claim 16, wherein generating the graphical user interface comprises option i) or iii), and wherein each respective slide of the plurality of slides further comprises a respective indicator for indicating a slide number among a total number of slides for the respective slide.

* * * * *